UNITED STATES PATENT OFFICE.

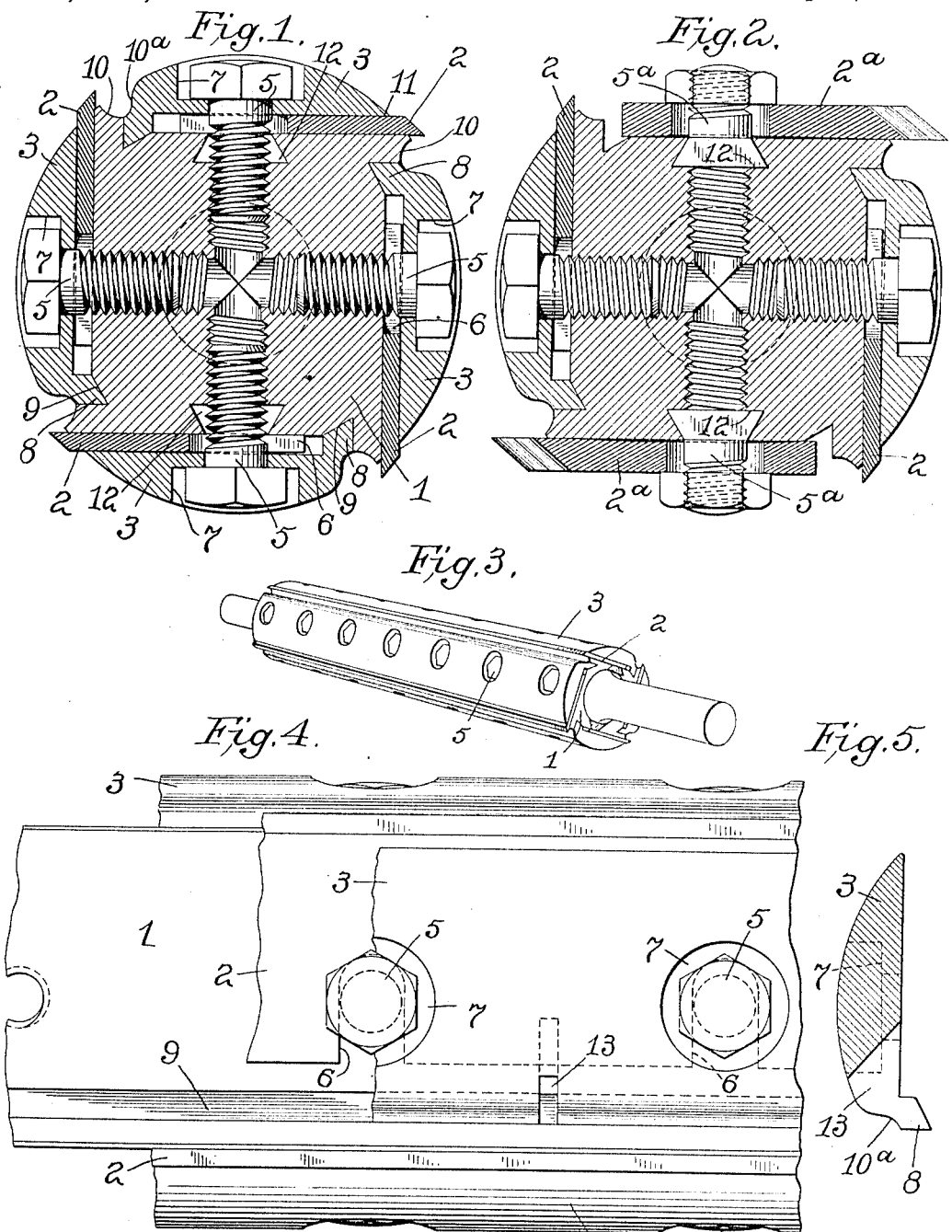

FRANK STUTZMAN, OF WILLIAMSPORT, PENNSYLVANIA.

CIRCULAR CUTTER-HEAD.

1,071,970.  Specification of Letters Patent.  Patented Sept. 2, 1913.

Application filed March 1, 1913. Serial No. 751,632.

*To all whom it may concern:*

Be it known that I, FRANK STUTZMAN, citizen of the United States, residing at Williamsport, Pennsylvania, have invented certain new and useful Improvements in Circular Cutter-Heads, of which the following is a specification.

The present invention relates to improvements in rotary cutter heads for wood working tools.

An improved form of safety circular cutter head is provided which will preclude any serious injury to the operator, such as the loss of a hand or finger, as has not infrequently been the case with the old form of square head cutter.

The novel subject matter of this invention resides more particularly in the manner of arranging and clamping the knife blades into the circular head.

The principal object is to provide a circular cutter head in which the knife blades are securely and adjustably arranged within the head by means of clamping cap plates and bolts, the clamping cap plates being of such shape as to conform with the circular contour of the head when clamped in position. The cap plates are further provided with an extending beveled rib adapted to engage a corresponding channel or recess formed in the head itself, thereby establishing a self-centering effect that will facilitate the assembling of the parts in their proper relation to each other.

With these and other objects in view, the invention consists in the structure and arrangement of parts herein set forth and claimed.

That a clearer understanding of the invention may be had, reference is made to the accompanying drawings, in which:—

Figure 1 is a vertical cross section of a cutter head embodying the present invention; Fig. 2 is a similar view showing a modified form of cutter head; Fig. 3 is a perspective view of the cutter head with parts assembled; Fig. 4 is a plan view of Fig. 1, with parts broken away to show their superimposed relation to each other. Fig. 5 is a detail sectional view of one of the clamping cap plates; Fig. 6 is a detail perspective of a tool used in adjusting the knife blades.

The cutter head or stock 1 is formed of approximately square cross section presenting four cutter or knife-receiving faces forming a continuous series, and disposed at right angles to each other. Against these faces the knife blades or cutters 2 are clamped by the cap plates 3, through which bolts 5 pass and are threaded into radial bores in the body of the head. The knife blades are formed with a series of recesses 6 (shown best in Fig. 4) extending inwardly from their inner edge and interspaced at intervals throughout their length for the passage of the bolts 5. The cap plates 3 are formed with curved outer surfaces which, when assembled, present a cylindrical exterior to the whole. In order that the cutter head may present a continuous cylindrical surface except where the knife blades project, the heads of the bolts 5 are countersunk in recesses 7 formed in the cap plates. Each cap plate has a beveled rib 8 of substantially dove-tail shape which registers with a corresponding groove 9 formed in the body of the head. This interlocking rib and groove relation between the cap plate and head body produces an effective means for self-centering the respective parts in relation to each other. By virtue of this arrangement one has only to place the cutter knife against the knife receiving face of the head, apply the cap plate by first inserting the rib 8 in its corresponding groove 9, and then with ease and rapidity is able to thread the bolt 5 into its bore and tighten the same by means of a wrench, whereupon the parts are securely held in place. An additional advantage is derived by the use of the rib and groove relation between the clamping cap and head body. By making the flat under surface of the cap plate 3 slightly inclined toward its forward edge, two points of bearing are maintained: one at its rear edge along the rib and groove connection, and the other at its forward edge at the point 11, near the working edge of the knife blade. The chip groove 10 is formed by a channeled recess portion formed in the body of the head, and a curved portion 10ª of the cap plate formed to conform to the general contour of the groove 10 when the parts are assembled.

In Fig. 2 a modified form of cutter head is shown with two novelty or molding knife blades applied to two opposite knife receiving surfaces of the cutter head. These novelty blades are held clamped against the knife receiving face of the cutter head by means of special bolts 5ª having tapered heads which register in correspondingly formed recesses 12 formed in the body of the cutter head. Ordinary nuts are screwed on the outer end of the bolts 5ᵃ to hold the blades in clamped relation to the cutter head or stock.

In order to provide for adjustment of the knife-blades, milled slots 13 (Figs. 4 and 5) are formed at intervals diagonally through the cap plates. By loosening the bolts 5 and inserting a small tool such as illustrated in Fig. 6, the knife blades can be adjusted to project at any desired degree beyond the periphery of the cylinder head, according to the nature of the work being done.

Having thus described my invention what I claim is:—

In combination, a rotary cutter head comprising a body or stock having a plurality of flat knife receiving surfaces with a groove at the inner end of each flat surface extending below said surface and having its forward wall inclined and with its rear wall extending vertically outward beyond the face, a plurality of clamping cap plates having curved outer faces presenting, when assembled, a cylindrical exterior, each of said cap plates being provided with an angular shaped tongue corresponding to the angular groove, a plurality of knife blades adapted to be clamped between said cap plates and the stock, means passing through the cap plates and knives and engaging the stock for clamping the knives in place, the inner edges of the cap plates and the adjacent portion of the stock being curved to form a chip breaking groove adjacent the preceding knife.

In testimony whereof, I affix my signature in presence of two witnesses.

FRANK STUTZMAN.

Witnesses:
 CHARLES H. ELDON,
 J. J. DIEFFENBACHER.

---

Copies of this patent may be obtained for five cents each, by addressing the "Commissioner of Patents, Washington, D. C."